United States Patent
Ahluwalia

(10) Patent No.: US 7,953,064 B2
(45) Date of Patent: May 31, 2011

(54) BUFFER STATUS REPORTING

(75) Inventor: Jagdeep Singh Ahluwalia, Sutton (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/452,122

(22) PCT Filed: Jun. 18, 2008

(86) PCT No.: PCT/JP2008/061505
§ 371 (c)(1),
(2), (4) Date: Dec. 16, 2009

(87) PCT Pub. No.: WO2008/156198
PCT Pub. Date: Dec. 24, 2008

(65) Prior Publication Data
US 2010/0135166 A1    Jun. 3, 2010

(30) Foreign Application Priority Data

Jun. 19, 2007   (GB) .................................. 0711884.7

(51) Int. Cl.
*H04J 3/21* (2006.01)
(52) U.S. Cl. ................... 370/349; 370/329; 370/395.21; 370/338
(58) Field of Classification Search .......... 370/352–357, 370/395.21, 395.41, 329, 341, 349, 310.2, 370/328, 338
See application file for complete search history.

(56) References Cited

U.S. PATENT DOCUMENTS

| 6,917,587 | B1 * | 7/2005 | Sarkar et al. .................. 370/230 |
|---|---|---|---|
| 2005/0078651 | A1 | 4/2005 | Lee et al. |
| 2005/0271031 | A1 | 12/2005 | Cho et al. |
| 2006/0009201 | A1 * | 1/2006 | Gallagher et al. ......... 455/414.1 |
| 2006/0018277 | A1 | 1/2006 | Petrovic et al. |
| 2006/0056346 | A1 | 3/2006 | Vadgama et al. |
| 2008/0101286 | A1 * | 5/2008 | Wang et al. .................... 370/329 |
| 2008/0311921 | A1 * | 12/2008 | Eckert et al. .................. 455/450 |
| 2010/0177716 | A1 * | 7/2010 | Harada et al. ................. 370/329 |
| 2010/0246504 | A1 * | 9/2010 | Kim et al. ..................... 370/329 |

FOREIGN PATENT DOCUMENTS

| EP | 1 509 011 A2 | 2/2005 |
|---|---|---|
| EP | 1 617 606 A1 | 1/2006 |
| EP | 1 679 933 A2 | 7/2006 |
| GB | 2 418 105 A | 3/2006 |
| WO | WO 02/056627 A1 | 7/2002 |
| WO | WO 2005/109690 A1 | 11/2005 |

OTHER PUBLICATIONS

R2-071345, XP-002503217, 3GPP TSG-RAN WG2#57bis, St. Julian's, Malta, Mar. 26-30, 2007, CATT, RITT, "Enhancement to Buffer Status Reporting".

* cited by examiner

*Primary Examiner* — Brenda Pham
(74) *Attorney, Agent, or Firm* — McGinn IP Law Group, PLLC

(57) ABSTRACT

A system is proposed to provide buffer status reporting in a mobile telecommunications environment, particularly applicable to 3GPP networks, which allows the base station to perform Quality of Service aware uplink resource allocation. The system uses two types of buffer status reports—Absolute Buffer Status Reports and Relative Buffer Status Reports. Absolute Buffer Status Reports are sent at application start up or when the buffer level is above or below set threshold values. Otherwise Relative Buffer Status Reports are sent, which encode the present buffer level in terms of the difference from the last transmitted Absolute Buffer Status Report.

2 Claims, 11 Drawing Sheets

File Download

File Upload

Sending End

File Download

File Upload

Sending End

BUFFER STATUS REPORTING

TECHNICAL FIELD

The present invention relates to the reporting of buffer status in mobile telecommunications networks, particularly but not exclusively networks operating according to the 3GPP standards or equivalents or derivatives thereof.

BACKGROUND ART

In mobile telecommunications networks, User Equipment (UE) wishing to send data transmit buffer status reports to the base station (eNodeB) indicating the amount of data it has buffered for transmission. In response, the base station allocates appropriate system resources and transmission opportunities to the UE so that it can transmit its data. In the 3GPP, there has been a recent understanding that more detailed buffer status reports should be made to support better QoS-aware scheduling compared with the proposed High-Speed Uplink Packet Access (HSUPA). The inventor has realized that improvements are needed to the way in which the buffer status is reported, to minimize the control signaling overhead needed.

Although for efficiency of understanding for those of skill in the art the invention will be described in detail in the context of a 3G system, the principles of buffer status reporting can be applied to other systems, e.g. other CDMA or wireless in which a mobile device or User Equipment (UE) communicates with one of several other devices (corresponding to eNodeB) with the corresponding elements of the system changed as required.

According to a first aspect, the present invention provides a method of signaling buffer status information from a mobile device to a base station, the method comprising: determining current buffer status information for the mobile device; determining a relationship between the current buffer status information and one or more defined criteria; and sending an absolute buffer status report, indicating the current buffer status, or a relative buffer status report, indicating a change in the buffer status since a previous buffer status report, to the base station in dependence upon the determined relationship.

The buffer status information used in determining the relationship may comprise, for example, the amount of data currently held in the buffer or the rate at which data is being written into the buffer. The reports sent may include the same type of buffer status data or different types of buffer status data as the data used for determining the relationship.

The relationship determined may be a determination that the buffer status information is within certain limits or that it is greater or less than some defined value. For example, if the current buffer status information comprises the change of rate at which data is being written into the buffer since a previous measurement, then the relationship that is determined may be whether the current buffer status information is above or below the defined change of rate.

The relative buffer status report may indicate the change in the amount of data held within the buffer since the previous buffer status report or a change of the rate at which data is being written into the buffer since the previous buffer status report. Preferably, the relative buffer status report indicates a change in the buffer status since the last transmitted absolute buffer status report, as this avoids the propagation of errors that might otherwise result.

The method may also comprise the step of differencing the current buffer status information and the buffer status information corresponding to the last absolute buffer status report, to determine the change in the buffer status since the last transmitted absolute buffer status report.

In one embodiment, the mobile communications device can transmit different types of data at the same time and wherein the buffer status reports include buffer status information for each type of data. Each type of data is preferably associated with a radio bearer group and the buffer status reports include buffer status information for each radio bearer group. This allows the base station to be able to allocate the uplink resources (used for communicating data from the mobile communications device to the base station) based not only on the amount of data in the buffer, but also on the relative priority associated with different traffic types.

The present invention also provides a method of allocating resources to a mobile communications device comprising: storing buffer status information previously received from the mobile communications device and indicating the buffer status within the mobile communications device at a previous time point; receiving from the mobile communications device a relative buffer status report indicating a change in the buffer status within the mobile communications device since a previous buffer status report; using the stored buffer status report and the relative buffer status report to determine a current buffer status within the mobile communications device; and allocating resources to the mobile communications device in dependence upon the determined current buffer status.

The stored buffer status information is preferably an absolute buffer status report indicating the buffer status at the previous time point or it may be buffer status information obtained from such an absolute status report and updated with one or more subsequent relative buffer status reports. Preferably, the method only uses the stored absolute buffer status report and the latest relative buffer status report to determine the current buffer status within the mobile communications device.

In one embodiment, when the base station receives a new absolute buffer status report from the mobile communications device, it replaces the stored absolute buffer status report with the new absolute buffer status report.

The base station will preferably receive such buffer status reports from a number of different mobile devices and will allocate available resources depending on their transmission needs. Where the mobile devices can transmit different types of data having different priorities, the base station preferably allocates resources to one mobile device based on the buffer status reports received from that device as well as in dependence upon the data to be sent from other devices and the priority of that data.

The invention provides, for all methods disclosed, corresponding computer programs or computer program products for execution on corresponding equipment, the equipment itself (user equipment, nodes or components thereof) and methods of updating the equipment.

An embodiment of the invention will now be described, by way of example, with reference to the accompanying drawings in which:

BEST MODE FOR CARRYING OUT THE INVENTION:

Overview

Figure 1:
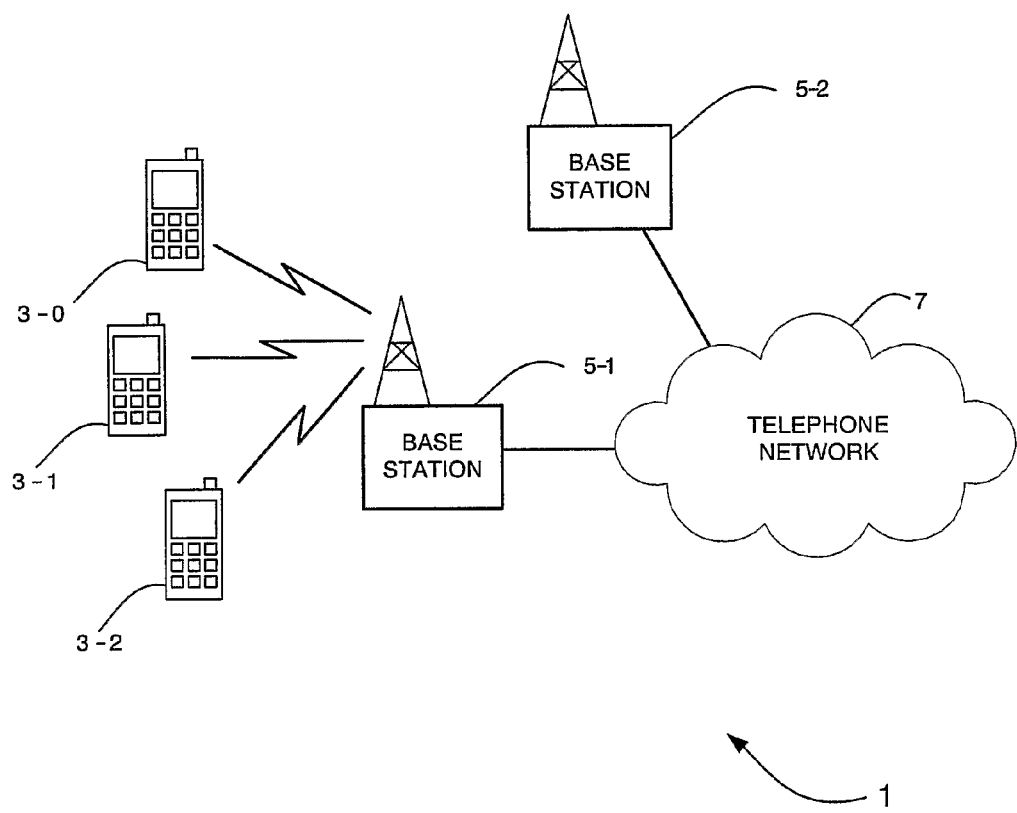
FIG. 1 schematically illustrates a mobile telecommunication system of a type to which the embodiment is applicable.

FIG. 1 schematically illustrates a mobile (cellular) telecommunication system 1 in which users of mobile telephones (MT) 3-0, 3-1, and 3-2 can communicate with other users (not shown) via one of the base stations 5-1 or 5-2 and a telephone network 7. A number of uplink and downlink communications resources (sub-carriers, time slots etc) are available for the wireless link between the mobile telephones 3 and the base stations 5. In this embodiment, the base stations 5 allocate downlink resources to each mobile telephone 3 depending on the amount of data to be sent to the mobile telephone 3. Similarly, the base stations 5 allocate uplink resources to each mobile telephone 3 depending on the amount and type of data the mobile telephone 3 has to send to the base station 5. To be able to do this, each mobile telephone 3 sends regular buffer status reports to its base station 5, informing the base station 5 of the amount and type of data it has in its buffers for transmission. In this embodiment, the mobile telephones 3 are arranged to send two types of buffer status reports:

1. Absolute Buffer Status Reports indicating the amount of data in the mobile telephone's buffer; and
2. Relative Buffer Status Reports indicating the change in the amount of data in the mobile telephone's buffer since the last Absolute buffer status report.

The inventors have found that this arrangement can significantly reduce the signalling overhead needed for QoS aware scheduling.

Base Station

Figure 2:
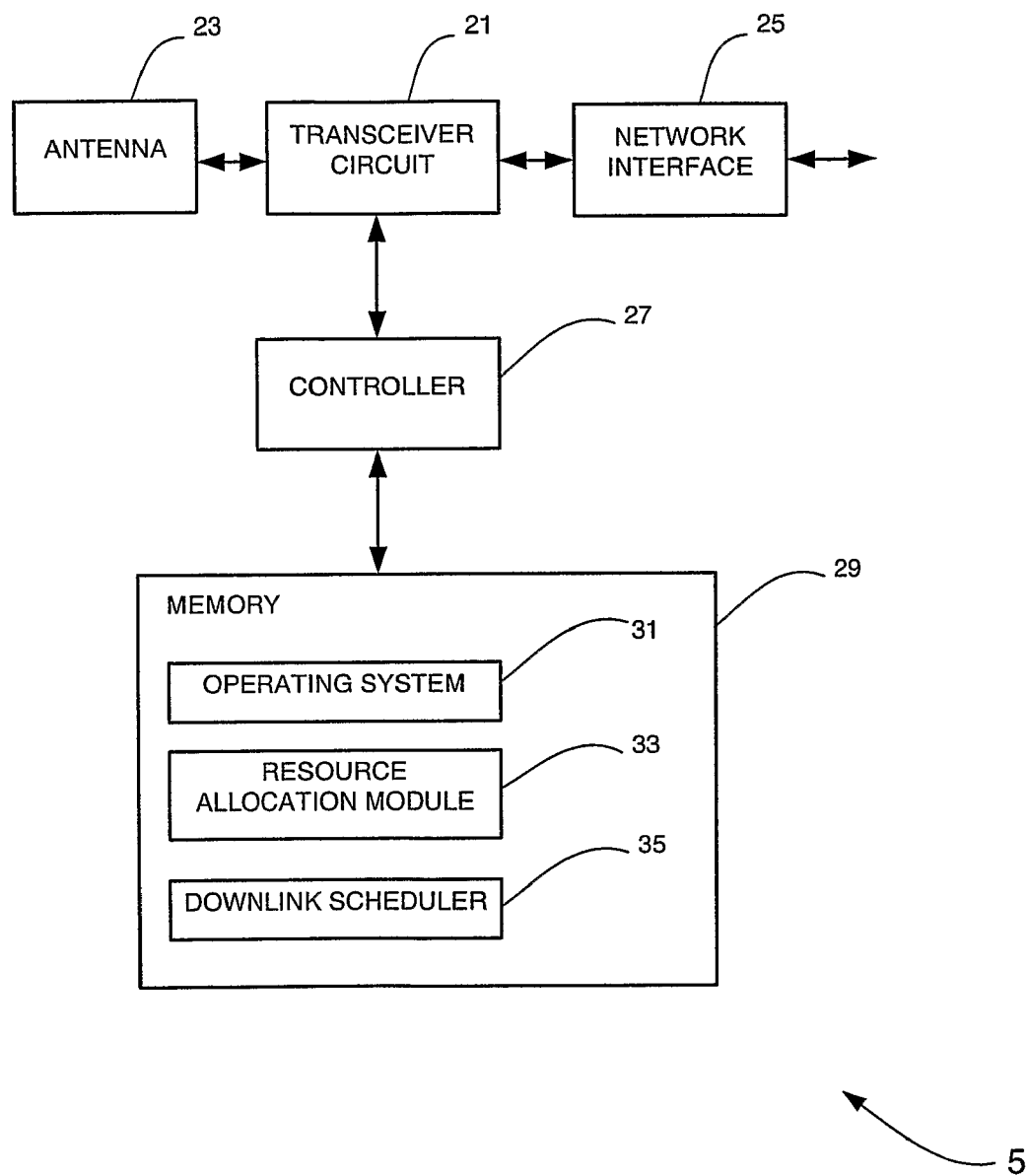
FIG. 2 schematically illustrates a base station forming part of the system shown in FIG. 1.

FIG. 2 is a block diagram illustrating the main components of each of the base stations 5 used in this embodiment. As shown, each base station 5 includes a transceiver circuit 21 which is operable to transmit signals to and to receive signals from the mobile telephones 3 via one or more antennae 23 and which is operable to transmit signals to and to receive signals from the telephone network 7 via a network interface 25. A controller 27 controls the operation of the transceiver circuit 21 in accordance with software stored in memory 29. The software includes, among other things, an operating system 31, a resource allocation module 33 and a downlink scheduler 35. The resource allocation module 33 is operable to allocate the above described communications resources for the uplink and downlink communications to each mobile telephone 3 and the downlink scheduler schedules the transmission of the downlink data to each mobile telephone 3 based on the allocated resources.

Mobile Telephone

Figure 3:
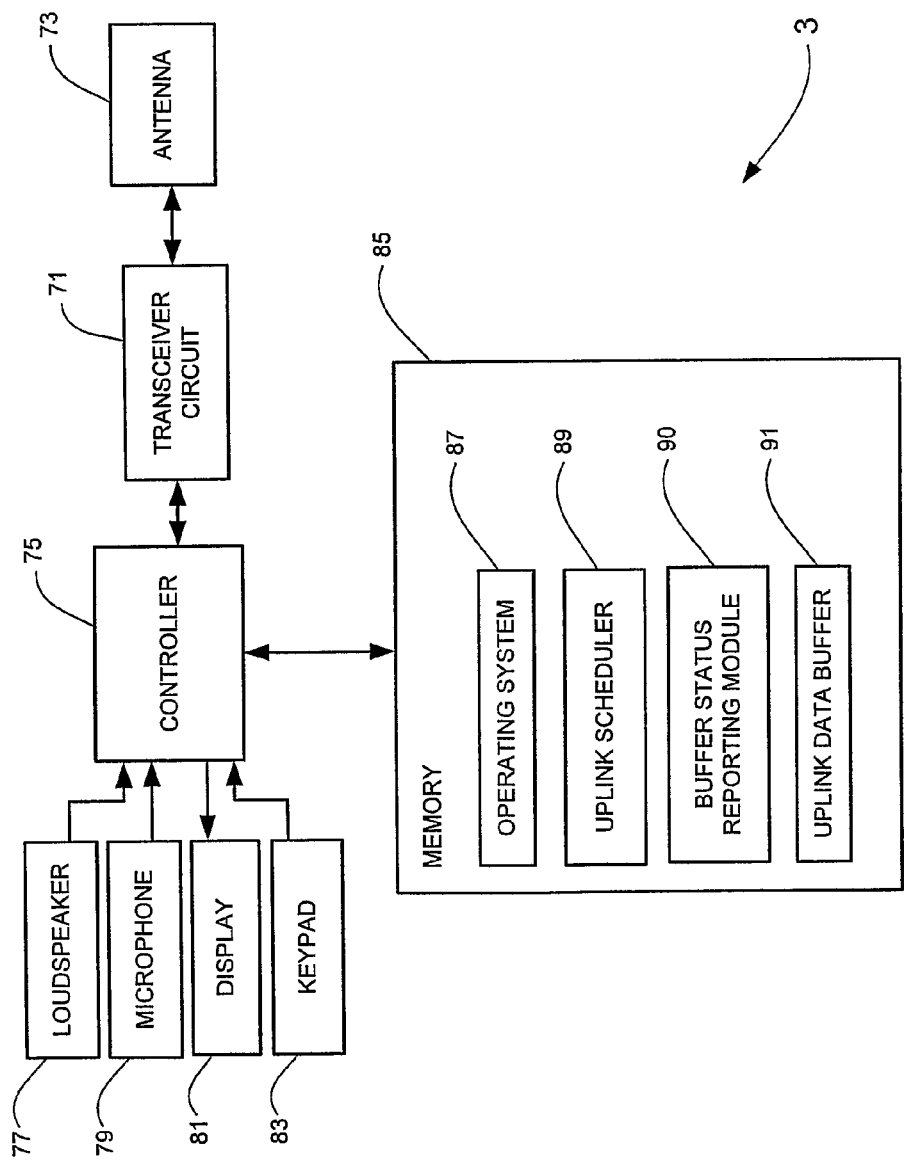
FIG. 3 schematically illustrates a mobile communication device forming part of the system shown in FIG. 1.

FIG. 3 is a block diagram illustrating the main components of each of the mobile telephones 3 shown in FIG. 1. As shown, the mobile telephones 3 include a transceiver circuit 71 that is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87, an uplink scheduler 89 and a buffer status reporting module 90. In this embodiment, the memory also provides an uplink data buffer 91. The uplink scheduler 89 is responsible for scheduling the transmission of the uplink data from the buffer 91 in accordance with the resources allocated to the mobile telephone 3 for its uplink transmissions by the base station 5; and the buffer status reporting module 90 is responsible for determining and signalling buffer status information to the base station.

In the above description, the base station 5 and the mobile telephones 3 are described for ease of understanding as having discrete resource allocation, scheduling and buffer status reporting modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

Figure 4:
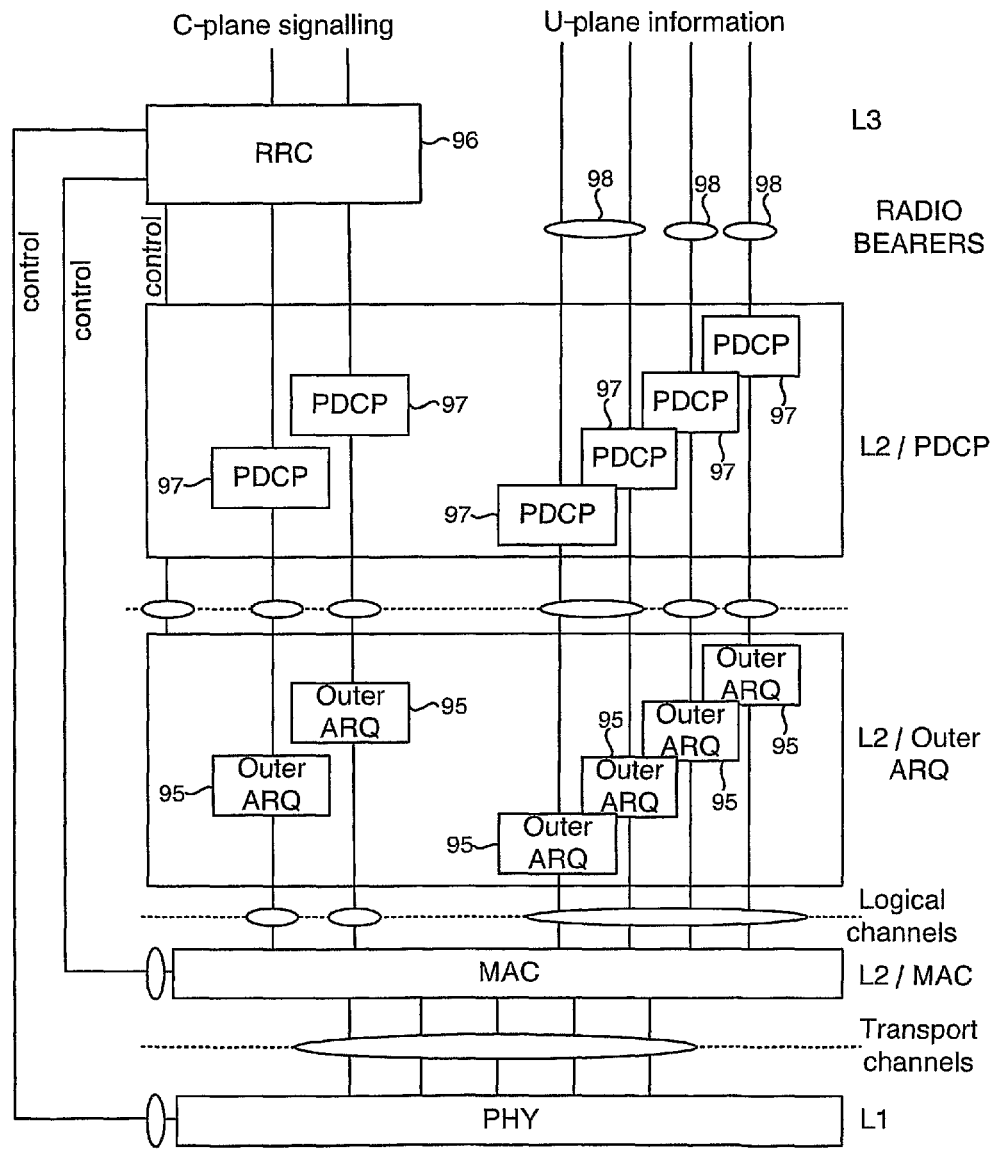
FIG. 4 illustrates three layers of a protocol stack used in the mobile communication device and the base station shown in FIG. 1.

FIG. 4 illustrates part of a protocol stack (lower three layers) used in the mobile telephones 3 and the base stations 5. The first layer is the physical layer (L1) which is responsible for the actual transmission of the data over the radio communication channel. Above that is the second layer (L2), which is divided into three sub-layers—the Medium Access Control layer (L2/MAC) which is responsible for controlling access to the air interface; the Outer ARQ layer (L2/OARQ) which is responsible for concatenation and segmentation of data packets, the acknowledgment of packets and the re-transmission of data packets where necessary; and the PDCP layer (L2/PDCP) which is responsible for header compression and ciphering. Above the second layer is the Radio Resource Control (RRC) layer (L3/RRC) that is responsible for controlling radio resources used in the air interface between the base station 5 and the mobile telephone 3. As shown, the L2/Outer ARQ layer includes a number of Outer ARQ entities 95 used to manage the transmission of C-plane data and U-plane data and the L2/PDCP layer includes PDCP entities 97 used to process the C-plane and the U-plane data.

FIG. 4 also shows the radio bearers 98 assigned to each source of data to be transmitted. Several software applications may be operating at the same time and each application may be sending and/or receiving data. The radio bearers are also grouped into groups depending on their data types. For example, the user may be using software on the mobile telephone 3 to upload a photograph to a website on the Internet and at the same time, he may be downloading a file from a network server. A respective radio bearer would be associated with each task and in this case, as they both relate to FTP (File Transfer Protocol), the two radio bearers would be in the same radio bearer group. If the user then makes a voice call, then another radio bearer (belonging to another radio bearer group) will be used to control the data transmission and reception for the voice call. Further, as the voice call data is more urgent, it is assigned a higher priority than the FTP data. The communication resources allocated by the base station 5 for the uplink are shared between the radio bearers 98, depending on their assigned priorities and data rates. The RRC layer 96 sets the data rate and priority for each radio bearer 98. The uplink scheduler 89 then controls the scheduling of the data packets of each radio bearer 98 for transmission based on the data rates and priorities assigned to the radio bearers by the RRC layer 96.

Figure 5A:
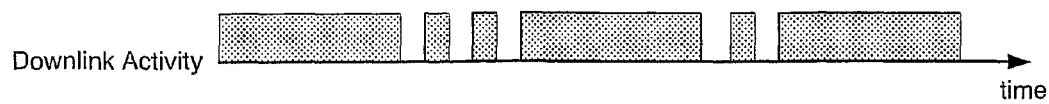
FIG. 5a illustrates a typical model of data transmissions for HTTP traffic.
Figure 5B:
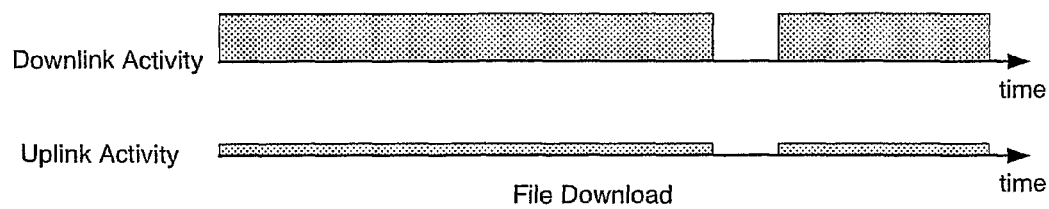
FIG. 5b illustrates a typical model of data transmissions for FTP file download traffic.
Figure 5C:
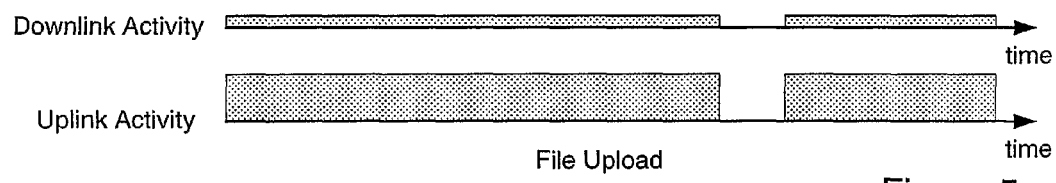
FIG. 5c illustrates a typical model of data transmissions for FTP file upload traffic.
Figure 5D:
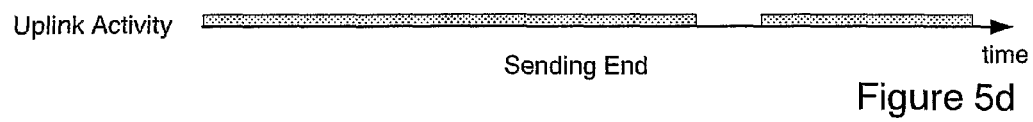
FIG. 5d illustrates a typical model of data transmissions for multimedia video sharing traffic.
Figure 5E:
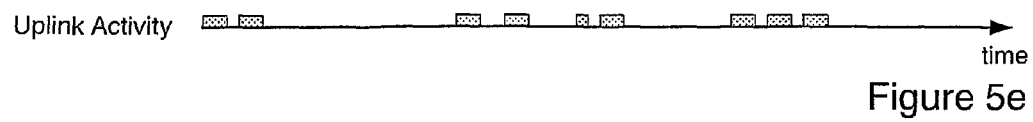
FIG. 5e illustrates a typical model of data transmissions for multimedia messaging/multiplayer games/push to talk traffic.
Figure 5F:
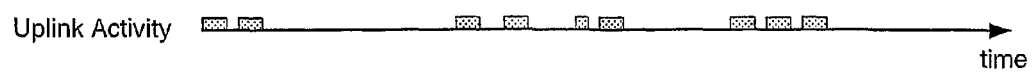
FIG. 5f illustrates a typical model of data transmissions for VoIP traffic.

Typically, the uplink resources required by a mobile telephone 3 will change over time as the data rate it has to transmit changes. This is illustrated in FIGS. 5a to 5f for different types of data, where the amount of data is represented by the height of the plot. In particular, FIG. 5a illustrates a typical model of data transmissions for HTTP traffic; FIG. 5b illustrates a typical model of data transmissions for FTP file download traffic; FIG. 5c illustrates a typical model of data transmissions for FTP file upload traffic; FIG. 5d illustrates a typical model of data transmissions for multimedia video sharing traffic; FIG. 5e illustrates a typical model of data transmissions for multimedia messaging/multiplayer games/push to talk traffic; and FIG. 5f illustrates a typical model of data transmissions for VoIP traffic. As shown, some applications like multimedia messaging generate bursty traffic that is unpredictable in nature, whereas others like VoIP are more predictable and allow for semi static allocation of resources through persistent scheduling. However, for TCP based traffic or multimedia video sharing traffic, the bit rates are more steady after the initial starting phase.

In this embodiment, in order to try to optimize the allocation of the uplink resources at any point in time, the base station 5 (and in particular the resource allocation module 33) dynamically adjusts the resources allocated to each mobile telephone 3 based on their needs. Prior to being transmitted, the uplink data associated with each radio bearer 98 is buffered in the uplink transmission buffer 91. Therefore, as the data rates change, the buffer 91 will fill or empty, depending on the difference between the resources needed and the resources currently allocated. Consequently, by signalling the amount of data in the buffer 91 to the base station 5, the base station 5 can dynamically adjust the resources allocated to each mobile telephone 3. In order that the base station 5 can allocate the uplink resources taking into account the quality of service (QoS) required for the different types of data being transmitted, the buffer status reports transmitted by the mobile telephones 3 include the buffer status for each of the different groups of radio bearers 98. In this way, the base station 5 will know, for each mobile telephone 3 that it is servicing, how much HTTP web browsing traffic the telephone 3 has to transmit; how much FTP traffic the telephone 3 has to transmit; how much multimedia video sharing traffic the telephone 3 has to transmit; how much VoIP traffic the telephone 3 has to transmit etc. The base station 5 can therefore allocate the available uplink resources amongst all the mobile telephones 3 based on the priority associated with the data each mobile telephone 3 has to transmit.

The inventor has appreciated that sending regular buffer status reports, each containing buffer status information for the different radio bearer groups, would require a significant signalling overhead and is unnecessary for a large part of the time as there are sustained periods in which the bit rates remain fairly constant. Therefore, the inventor proposes that the mobile telephones 3 send two types of buffer status reports—Absolute Buffer Status Reports and Relative Buffer Status Reports.

Absolute Buffer Status Reports (ABSR)

These would include the buffer status for each of the Radio Bearer Groups and can be sent during the session start phase when the application has just started and when the bit rate is changing in time before reaching a steady value. Absolute Buffer Status Reports would essentially be event triggered when the amount of data in the mobile telephone's buffer 91 (or alternatively in a traffic flow) gets above (or below) a predefined threshold value.

Relative Buffer Status Reports (RBSR)

These would include only differential buffer status (indicating a change in instantaneous bit rate) with respect to the last sent Absolute Buffer Status Report and can be sent periodically when the applications have reached relatively steady bit rates. Relative Buffer Status Reports will be of small size making it possible to piggyback the buffer status information in a data PDU (Protocol Data Unit) thereby considerably reducing the uplink overhead of sending Absolute Buffer Status Reports periodically for requesting uplink resources. The Relative Buffer Status Reports will include differential buffer status information for each radio bearer group, thereby allowing the base station 5 to be able to perform QoS aware uplink resource allocations between the mobile telephones 3 that it is servicing.

Figure 6A:
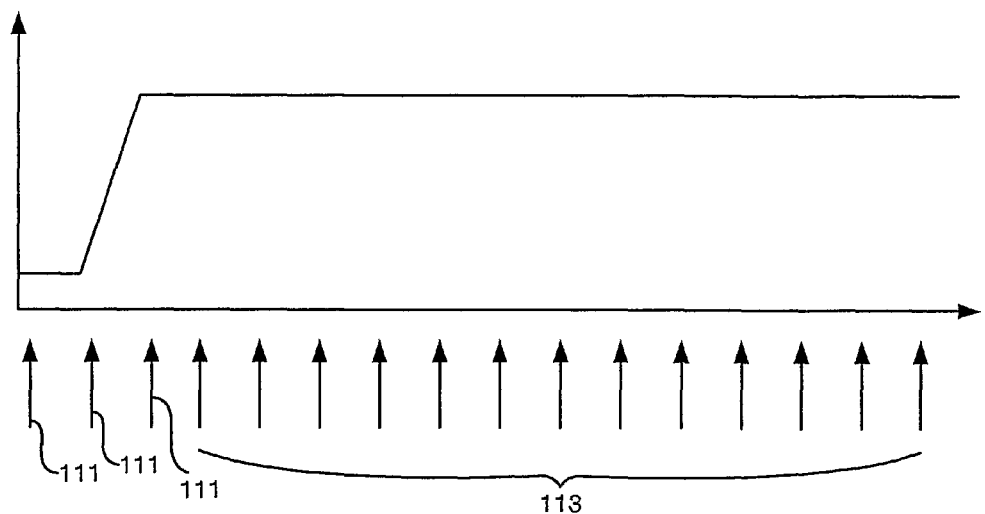
FIG. 6a illustrates the transmission of Absolute and Relative Buffer Status Reports for a single service case.
Figure 6B:
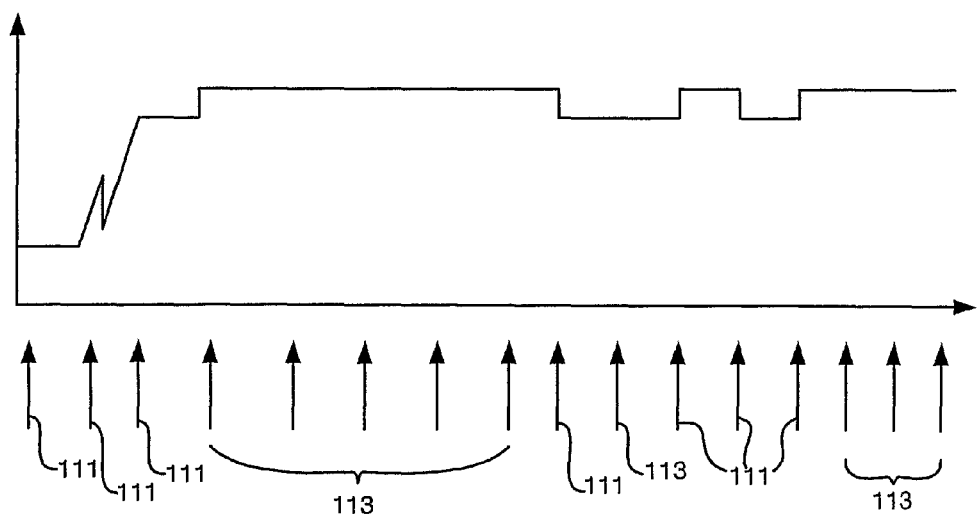
FIG. 6b illustrates the transmission of Absolute and Relative Buffer Status Reports for a multiple service case.

FIGS. 6a and 6b illustrate, respectively, an example use of Absolute and Relative Buffer Status Reports for a single service case (file upload) and a multiple service case (file upload+TCP/RLC acknowledgments for web browsing traffic). As shown in FIG. 6a, Absolute Buffer Status Reports 111 are sent at the start, when the application has just started and when the bit rate changes. Thereafter, Relative Buffer Status Reports 113 are sent periodically whilst the data rate remains fairly constant. As shown in FIG. 6b, because there are two user data sources (one a file upload and the other acknowledgements for received user data packets), the required data rate varies more over the illustrated period and so more Absolute Buffer Status Reports 111 are sent.

In this embodiment, the buffer status reporting module 90 determines whether to send an Absolute or a Relative Buffer Status Report by comparing the amount of data in the buffer 91 with a stored upper threshold ($T_U$) and a stored lower threshold ($T_L$). If the amount of data in the buffer is above the upper threshold or below the lower threshold, then the buffer status reporting module 90 will send an Absolute Buffer Status Report, otherwise it will send a Relative Buffer Status Report. As those skilled in the art will appreciate, in order to be able to calculate a Relative Buffer Status Report from the measured buffer status information, the buffer status reporting module 90 has to store the buffer status information transmitted in the last Absolute Buffer Status Report that was sent, and this information is stored in the memory 85.

With regard to the operation of the base station 5 and in particular the resource allocation module 33, it will have to keep track of the Absolute Buffer Status Reports received from the various mobile telephones 3 that it is servicing and use them with the received Relative Buffer Status Reports to determine the current buffer status in each mobile telephone 3, so that it can perform the dynamic resource allocation.

As those skilled in the art will appreciate, there are different ways in which the Relative Buffer Status Reports can encode the required information. For example, they can include a count of the number of bits more or less than the number of bits in the last transmitted Absolute Buffer Status Report or a percentage change (in say increments of 25%) since the last Absolute Buffer Status Report. Relative Buffer Status Reports could also include, for example:

1. The number of bytes added or removed from the buffer for each radio bearer group (within predefined thresholds) since the last Absolute Buffer Status Report; or
2. The current buffer size as a percentage of size reported in the last ABSR e.g. 0 to 200 percent with 25% increment; or
3. The Base station 5 and mobile telephone 3 could agree a reference buffer size by higher layers, and then the Relative Buffer Status Report can signal the current size as a percentage of this reference; or It would also be possible to use Relative Buffer Status Reports which indicate the change in buffer status relative to the last Relative Buffer Status Report. However, this is not preferred as if one Relative Buffer Status Report is lost (not received by the base station 5) then an error will propagate through the subsequent reports, until the next Absolute Buffer Status Report. When the relative reports are made relative to the last Absolute Buffer Status Report, lost status reports do not matter as the next Relative Buffer Status report will be correct.

As those skilled in the art will appreciate, there are also various ways in which the mobile telephones 3 may decide whether to send an Absolute or a Relative Buffer Status Report. In the above example, the buffer status reporting module 90 compared the amount of data in the buffer with upper and lower thresholds. Alternatively, the rate at which data is being written into the buffer 91 may be compared with upper and lower thresholds. Alternatively still, the difference in the data rate or the difference in the actual amount of data stored in the buffer between a current time point and a previous time point may be compared with a defined value, with the result defining whether to send an Absolute or a Relative Buffer Status Report.

Additionally, as those skilled in the art will appreciate, the buffer status information used to determine whether to send an Absolute or a Relative Buffer Status Report may be different to the buffer status data included in the report. For example, the determination may be made based on the rate at which data is being written into the buffer 91, whilst the report may contain a count relating to the actual amount of data contained in the buffer 91 or a count relating to the change in the amount of data in the buffer 91, depending on if the report is an Absolute or a Relative Buffer Status Report.

As those skilled in the art will appreciate, the operations of the base station 5 and of the mobile telephones 3 may be controlled by dedicated hardware circuits or by programmable controllers controlled by software. The software may be provided at the time of manufacture or subsequently installed after downloading the software from a remote site.

In addition, the Relative Buffer Status Reports could also be utilized as an indication to the base station 5 to switch from a talk spurt period to a silent period and vise versa for the VoIP service. Based on this indication from mobile telephone 3, the base station 5 can release persistently allocated uplink resources when switching from a talk spurt period to a silent period or re-allocate uplink resources when switching from a silent period to a talk spurt period.

Various other modifications will be apparent to those skilled in the art and will not be described in further detail here.

The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Introduction/Background

In previous RAN 2 meetings Buffer Reporting for E-UTRAN has been actively discussed with respect to the contents and granularity of buffer reporting. It is now a the general understanding within RAN 2 that more detail buffer status information should be reported to eNB to support QoS-aware scheduling better compared with HSUPA in which only total buffer status and the highest priority logical channel's buffer status are reported to NB. Generally it is agreeable that the buffer status report based a Radio Bearer group would be adopted in LTE in order to have QoS-aware scheduling and at the same time to limit the control signalling overhead as compared to per Radio Bearer Reporting. In this contribution we investigate the uplink traffic model for various applications and suggest optimized reporting to minimize the control signalling overhead.

Source Traffic Model of Major Applications in Uplink

A source traffic model essentially consists of two parts: the arrival process for the user activities and the process describing the activity phase. The arrival process determines the instants when a user starts his activity. Such instants are denoted as arrival times. If WWW users are considered, the instant a user begins with his web browsing session is the arrival time for the HTTP application. The modeling approaches for the arrival process are not considered here and are assumed to be identical for the various applications for simplicity.

The described traffic models are based on a general form of ON/OFF model where a session is generally composed of the some random number of ON/OFF periods described by the appropriate distribution. Each ON period will be further specified in terms of random number of packets, packets durations, packet itert-arrival times, etc.

Figure 7:
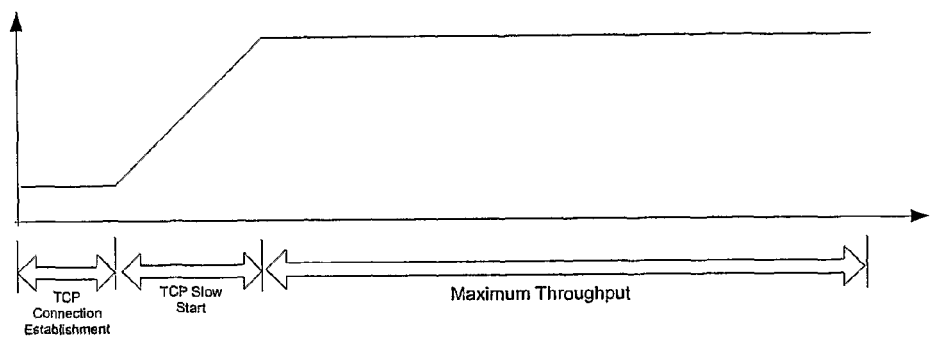
FIG. 7 illustrates a traffic model for TCP based applications in the 3GPP LTE standard.

The models for the activity phase will be described in the following sections individually for the different services focusing on the uplink traffic patterns. Further, for the TCP based applications, the traffic model assumes the steady maximum bit rate during the activity phase after the slow start. The delay components are illustrated in FIG. 7.

HTTP Web Browsing Traffic

Figure 8:
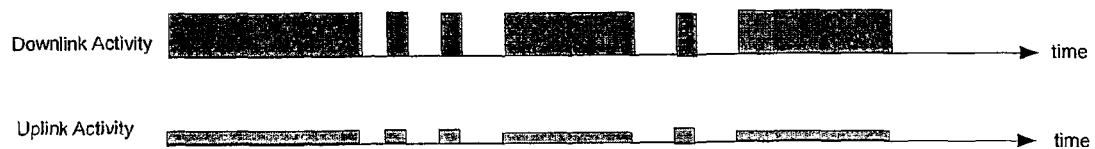
FIG. 8 illustrates a typical model for HTTP Web browsing traffic in the 3GPP LTE standard.

Web browsing model in its simple form is an ON/OFF model where ON state represents the activity for fetching all objects belonging to one web request after accepting it and the OFF state represents a silence period after all objects in a web request are retrieved. The web traffic is essentially a downlink extensive with steady stream the TCP/ARQ acknowledgements in the uplink during the ON period as shown in FIG. 8.

FTP Traffic

Figure 9:
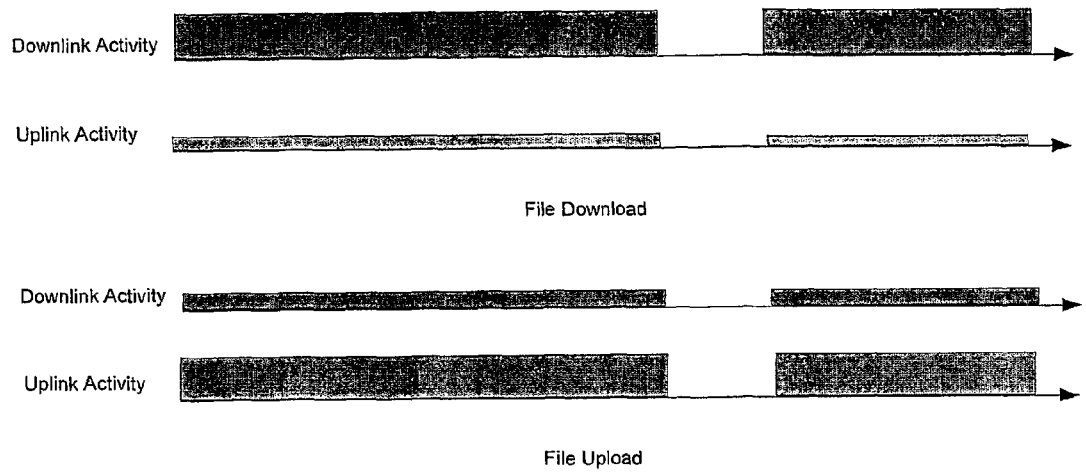
FIG. 9 illustrates a typical model for FTP traffic.

The FTP service can be included by describing an FTP file transfer like a web session with only one web request with prolonged active phase. The FTP file transfer is carried out in a manner illustrated in FIG. 9.

Multimedia Video Sharing

Figure 10:
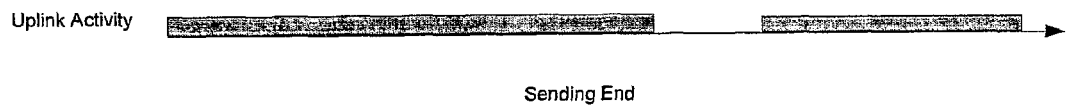
FIG. 10 illustrates a general pattern of an uplink in multimedia video sharing.

Imaging service such as real time video sharing is about showing to the other end what is going on in your side of the phone connection. Based on initial estimates from video streaming codecs in current networks, a lower bit rate limit is typically around 40 to 64 kbps for a duration varying from tens of seconds to few minutes. For streaming traffic the resources could be persistently allocated, as shown in FIG. 10, however since the streaming traffic could fluctuate between MBR and GBR, we feel that it might be more efficient to allocate the resources dynamically.

Multimedia Messaging/Multiplayer Games/Push-to-Talk

Figure 11:
FIG. 11 illustrates a general pattern in multimedia messaging/multiplayer games/push-to-talk.

These applications are characterized by short bursts of data at irregular intervals dependent on the user action. The general pattern is shown in FIG. 11.

VoIP

Figure 12:
FIG. 12 illustrates a general pattern in VoIP traffic.

VoIP application will generate packets of constant size every 20 ms during the talk spurt in a manner illustrated in FIG. 12.

Multimedia messaging/multiplayer games/Push-to-Talk applications generate traffic burst that is unpredictable in nature and the exact buffer status is needed by the uplink eNB Scheduler to appropriately allocate resources.

For VoIP the packets are generated every 20 ms sec during the talk spurt and the resources would be allocated in the semi static manner through persistent scheduling and therefore dynamic resource allocations for VoIP is not considered further in the paper.

For TCP based traffic or multimedia video sharing the applications would attain steady bit rate after stating and UE would have to request uplink resources periodically during the activity phase. We believe the uplink signalling overhead reporting buffer status for such can be considerably optimized.

Buffer Status Reporting

Based on the traffic patterns for the most common applications being used in the wireless world we could define mechanism for the optimized buffer status reporting mechanism to satisfy the two requirements 1. granularity of buffer status reports that is sufficient enough to perform QoS aware scheduling
2. minimize the control signalling overhead For LTE system, we feel that the buffer status reports based on the radio bearer groups having the same priority would be sufficient to perform QoS aware scheduling. In this scheme UE would include the buffer status of all the Radio Bearer Groups (RBG) in every report and would consequently incur overhead especially if there are many RBG.

Looking at the traffic patterns of various applications in section 2 we find that there are sustained periods of time (ON period) during which the bit rate for the TCP based applications such as FTP (file upload), SMTP (sending email) and HTTP (TCP/RLC acks) would remain fairly constant after the TCP slow start phase. For multimedia video sharing applications, nearly constant bit rate would also be maintained during the ON periods.

Considering this, we feel that there would be large overhead if the UE keeps reporting the buffer status of all the Radio Bearer Groups (RBG) in every report especially for the duration when the bit is fairly constant. In order to reduce the uplink overhead we propose that we have two kinds of buffer reports.

Absolute Buffer Status Reports
Relative Buffer Status Reports

Absolute Buffer Status Reports (ABSR): These would include the buffer status of all the Radio Bearer Groups and can be sent during the session start phase where the application has just started and the bit rate is changing in time before reaching a steady value. Absolute Buffer Status Reports would essentially be event triggered when the amount of data in the UE buffer (or alternatively in a traffic flow) gets above (or below) a predefined threshold value.

Relative Buffer Status Reports (RBSR): These would include only differential buffer status (indicating a change in instantaneous bit rate) with respect to the last sent Absolute Buffer Status report and can be sent periodically when the applications have reached relatively steady bit rates. Relative Buffer Status reports will be of small size making it possible to piggyback the Buffer information in a data PDU thereby considerably reducing the uplink overhead of sending Absolute Buffer Status report periodically for requesting uplink resources.

Relative Buffer Status Reports could include

Figure 13:
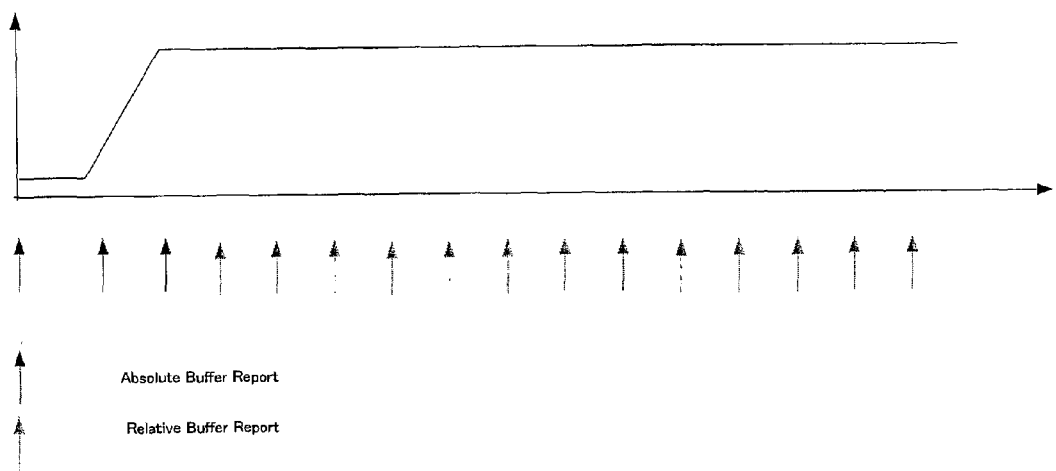
FIG. 13 illustrates transmission of absolute and relative buffer status reports in a single service case.
Figure 14:
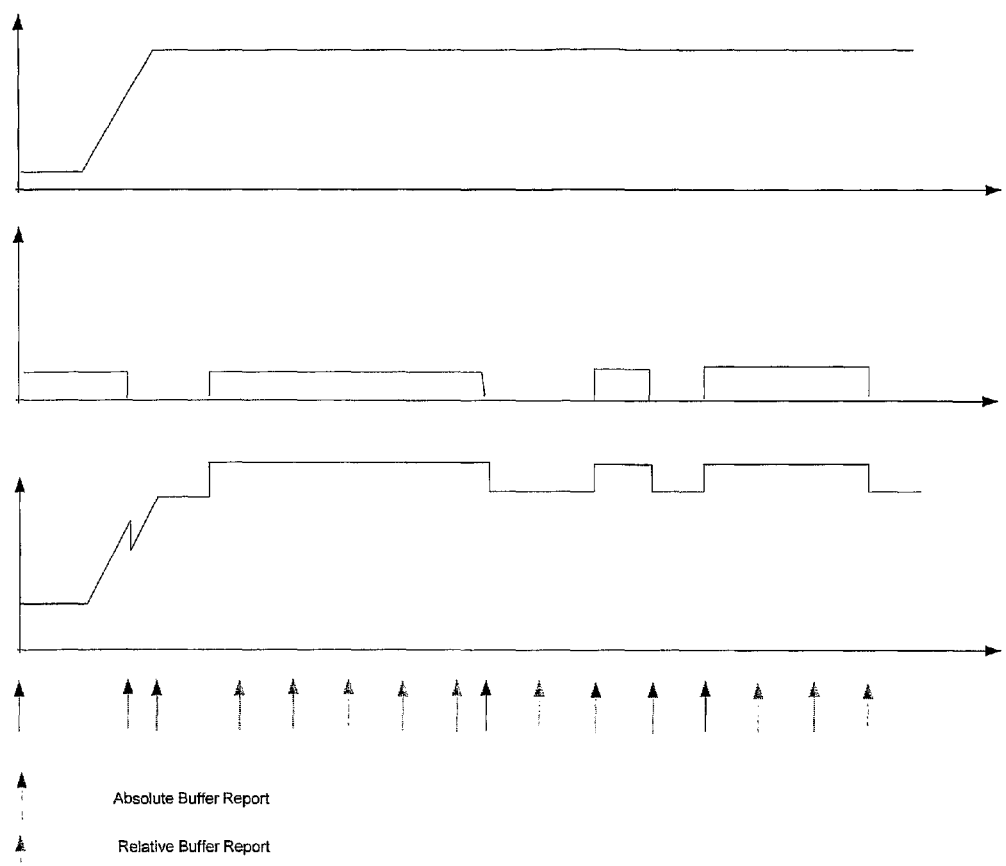
FIG. 14 illustrates transmission of absolute and relative buffer status reports in a multi service case.

1. Number of bytes added or removed form the buffers within a predefined thresholds since the last Absolute Buffer Status Report or
2. Current buffer size as a percentage of size reported in the last ABSR e.g. 0 to 200 percent with 25% increment or
3. eNB and UE could agree a reference buffer size by higher layers, and then the Relative Buffer Status report can signal the current size as a percentage of this reference
4. RBSR could also be utilized as an indication to the eNB to switch from Talk spurt period to silent period and vise versa for the VoIP service. Based on this indication from UE, eNB can release persistently allocated resources when switching form talk spurt period to silent period or re allocated resources when switching from silent to talk spurt period The example illustrating the use of absolute and relative buffer status reports in combination for single service and multiple service cases are illustrated in FIGS. 13 and 14.

Conclusions

We propose to have Relative Buffer Status Reports additionally to the Absolute Buffer Status Reports to reduce the signalling overhead for buffer status reporting in LTE. UE can smartly switch from Absolute to Relative Buffer Status Report after the application has attained steady bit rate. The use of Absolute to Relative Buffer Status Report for single and multiple service cases are illustrated to demonstrate the decrease in signalling overhead. With such schemes, the signalling overhead can be kept to acceptable limits without loss of granularity of information provided to the uplink eNB scheduler to perform QoS-aware scheduling.

REFERENCES

[1] R2-060829, Buffer Reporting for E-UTRAN, Nokia.
[2] R2-061915, Comparison of UL buffer reporting/scheduling schemes in LTE, Motorola Annex: Error Handling We believe that the combination of the Absolute and Relative Buffer Status Report would provide a robust mechanism for uplink eNB scheduler to perform QoS—aware scheduling.

Figure 15:
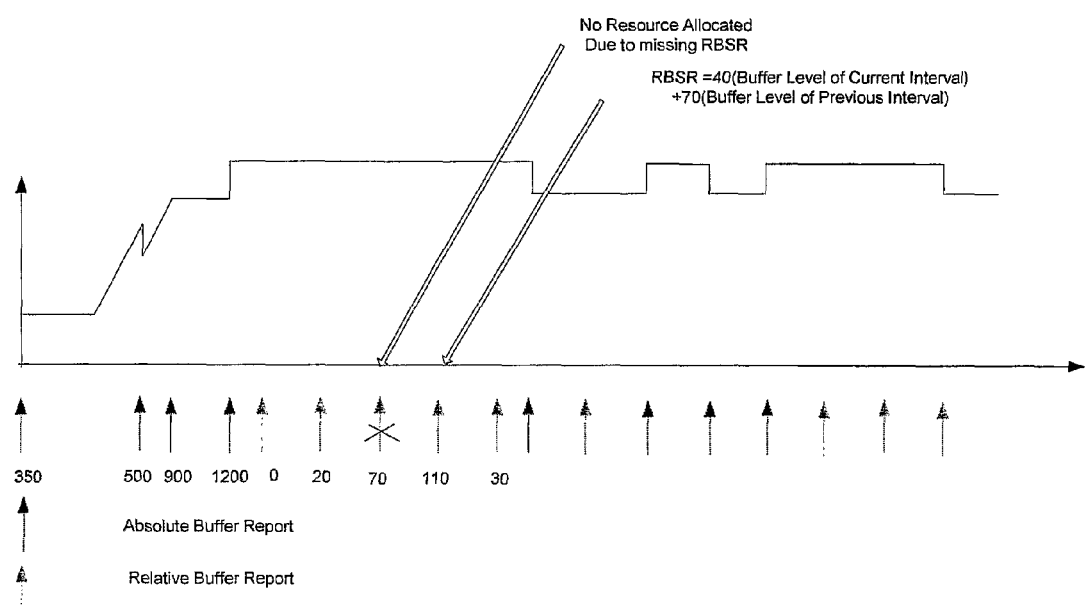
FIG. 15 illustrates an error handling operation using both the absolute and relative buffer status reports.

Since the Relative Buffer Status Report (RBSR) is a differential buffer status (indicating a change in instantaneous bit rate) with respect to the last sent ABSR, even if one of the RBSR is lost, UE in the next scheduled interval shall again report the differential with respect to the last ABSR or send ABSR if the buffer increases predefined threshold. The network will be able to allocate resources appropriately on receiving subsequent RBSR or ABSR after a lost RBSR as shown in FIG. 15.

Finally, the examples of the present invention will be enumerated below.

An example 1 describes a method of signalling buffer status information from a mobile communications-device to a base station, the method comprising:

determining current buffer status information for the mobile communications device;

determining a relationship between the current buffer status information and one or more defined criteria; and sending an absolute buffer status report, indicating the current buffer status, or a relative buffer status report, indicating a change in the buffer status since a previous buffer status report, to the base station in dependence upon the determined relationship.

An example 2 describes the method wherein said buffer status information comprises the amount of data currently held in the buffer.

An example 3 describes the method wherein said buffer status information comprises the rate at which data is being written into the buffer.

An example 4 describes the method wherein said absolute buffer status report indicates the total amount of data held within the buffer.

An example 5 describes the method wherein said absolute buffer status report indicates the rate at which data is being written into the buffer.

An example 6 describes the method wherein said relative buffer status report indicates the change in the amount of data held within the buffer since said previous buffer status report.

An example 7 describes the method wherein said relative buffer status report indicates the number of bytes added or removed from the buffer within predefined thresholds since the last absolute buffer status report.

An example 8 describes the method wherein said relative buffer status report indicates the current buffer size as a percentage of the buffer size reported in the last absolute buffer status report.

An example 9 describes the method wherein said relative buffer status report indicates the current size of the buffer as a percentage of a predefined reference buffer size.

An example 10 describes the method wherein said relative buffer status report indicates a change of the rate at which data is being written into the buffer since said previous buffer status report.

An example 11 describes the method wherein said relative buffer status report indicates a change in the buffer status since the last transmitted absolute buffer status report.

An example 12 describes the method comprising the step of differencing the current buffer status information and the buffer status information corresponding to the last absolute buffer status report to determine the change in the buffer status since the last transmitted absolute buffer status report.

An example 13 describes the method wherein said one or more criteria includes upper and lower limits, wherein said determined relationship determines if the current buffer status information falls within said upper and lower limits.

An example 14 describes the method comprising sending the absolute buffer status report if the current buffer status information falls outside said upper and lower limits and sending the relative buffer status report if the current buffer status information falls within said upper and lower limits.

An example 15 describes the method wherein said one or more criteria includes a defined change of rate at which data is being written into the buffer, wherein said current buffer status information comprises the change of rate at which data is being written into the buffer since a previous measurement and wherein the relationship is whether the current buffer status information is above or below the defined change of rate.

An example 16 describes the method wherein the mobile communications device can transmit different types of data and wherein the buffer status reports include buffer status information for each type of data.

An example 17 describes the method wherein each type of data is associated with a radio bearer group and wherein the buffer status reports include buffer status information for each radio bearer group.

An example 18 describes the method comprising transmitting data from multiple sources within each radio bearer group.

An example 19 describes the method comprising indicating in a relative buffer status report that the base station should switch between a talk spurt period and a silent period for a VoIP service.

An example 20 describes a method of allocating resources to a mobile communications device, comprising:

storing buffer status information previously received from the mobile communications device, which indicates a previous buffer status within the mobile communications device;

receiving from the mobile communications device a relative buffer status report indicating a change in the buffer status within the mobile communications device since a previous buffer status report;

using the stored buffer status information and the relative buffer status report to determine a current buffer status within the mobile communications device; and allocating resources to the mobile communications device in dependence upon the determined current buffer status within the mobile communications device.

An example 21 describes the method wherein said using step uses only a stored absolute buffer status report and the relative buffer status report to determine the current buffer status within the mobile communications device.

An example 22 describes the method wherein said using step uses a stored absolute buffer status report, the received relative buffer status report and one or more previously received relative buffer status reports to determine the current buffer status within the mobile communications device.

An example 23 describes the method comprising receiving a new absolute buffer status report from the mobile communications device and updating the stored buffer status information with the new absolute buffer status report.

An example 24 describes the method comprising receiving buffer status reports from a plurality of mobile communications devices and wherein said allocating step allocates resources to the mobile communications device also in dependence upon the buffer status reports received from at least one other mobile communications device.

An example 25 describes the method wherein the buffer status reports include buffer status information for different types of data transmitted from the mobile communications device, the data types having different priorities, and wherein said allocating step allocates resources to the mobile communications device in dependence upon the buffer status information received for the different types of data.

An example 26 describes the method wherein the relative buffer status report includes an indication to switch between a talk spurt and a silent period and wherein, in response to receiving the indication to switch, the method comprises the step of releasing or re-allocating persistently allocated uplink resources to the mobile communications device.

An example 27 describes a mobile communications device comprising:
  means for determining current buffer status information for the mobile communications device;
  means for determining a relationship between the current buffer status information and one or more defined criteria; and
  means for sending an absolute buffer status report, indicating the current buffer status, or a relative buffer status report, indicating a change in the buffer status since a previous buffer status report, to the base station in dependence upon the determined relationship.

An example 28 describes the mobile communications device comprising:
  a controller operable under program control to:
  determine current buffer status information for the mobile communications device;
  determine a relationship between the current buffer status information and one or more defined criteria; and
  send an absolute buffer status report, indicating the current buffer status, or a relative buffer status report, indicating a change in the buffer status since a previous buffer status report, to the base station in dependence upon the determined relationship.

An example 29 describes the mobile communications device operable to perform the method of any of the examples 2 to 19.

An example 30 describes a base station comprising:
  means for storing buffer status information previously received from the mobile communications device and indicating a previous buffer status within the mobile communications device;
  means for receiving from the mobile communications device a relative buffer status report indicating a change in the buffer status within the mobile communications device since a previous buffer status report;
  means for using the stored buffer status information and the relative buffer status report to determine a current buffer status within the mobile communications device; and
  means for allocating resources to the mobile communications device in dependence upon the determined current buffer status within the mobile communications device.

An example 31 describes a base station comprising:
  a controller operable under program control to:
  store buffer status information relating to a previous buffer status within the mobile communications device;
  receive from the mobile communications device a relative buffer status report indicating a change in the buffer status within the mobile communications device since a previous buffer status report;
  use the stored buffer status information and the relative buffer status report to determine a current buffer status within the mobile communications device; and
  allocate resources to the mobile communications device in dependence upon the determined current buffer status within the mobile communications device.

An example 32 describes the base station operable to perform the method of any of the examples 21 to 26.

An example 33 describes a computer implementable instructions product comprising computer implementable instructions for causing a computer device to perform the method of any of the examples 1 to 26.

An example 34 describes a method of signalling buffer status information from a mobile communications device to a base station, the method comprising,
  determining current buffer status information for the mobile communications device;
  determining a relationship between the current buffer status information and one or more defined criteria;
  sending a buffer status report indicating the current buffer status to the base station in dependence upon the determined relationship; and
  indicating in the buffer status report that the base station should switch between a talk spurt period and a silent period for a VoIP service.

An example 35 describes a method of signalling buffer status information from a mobile communications device to a base station, the method comprising:
  transmitting different types of data from the communications device to the base station, each type of data being associated with a respective radio bearer group;
  buffering data to be transmitted in a transmit buffer;
  determining buffer status information for data buffered in the transmit buffer for each radio bearer group;
  sending a buffer status report indicating the current buffer status for each radio bearer group to the base station in dependence upon the determined buffer status information; and
  including an indication in the buffer status report that the base station should switch between a talk spurt period and a silent period for a VoIP service.

An example 36 describes a method of allocating resources to a mobile communications device comprising:
  receiving data from a mobile communications device;
  receiving a buffer status report from the mobile communications device indicating that the base station should switch between a talk spurt period and a silent period for a VoIP service; and
  releasing or re-allocating persistently allocated uplink resources to the mobile communications device in dependence upon the received indication.

An example 37 describes a method of allocating resources to a mobile communications device comprising:
  receiving different types of data from a mobile communications device;
  receiving a buffer status report from the mobile communications device having buffer status information for each type of data and an indication that the base station should switch between a talk spurt period and a silent period for a VoIP service; and
  releasing or re-allocating persistently allocated uplink resources to the mobile communications device in dependence upon the received indication.

This application is based upon and claims the benefit of priority from United Kingdom patent application No. 0711884.7, filed on Jun. 19, 2007, the disclosure of which is incorporated herein in its entirety by reference.

The invention claimed is:

1. A method of allocating resources to a mobile communications device comprising:
  at a base station;
  receiving data from a mobile communications device;
  receiving a buffer status report from the mobile communications device indicating that the base station should switch between a talk spurt period and a silent period for a VoIP service; and
  releasing or re-allocating persistently allocated uplink resources to the mobile communications device in dependence upon the received indication.

2. A method of allocating resources to a mobile communications device comprising:
   at a base station;
   receiving different types of data from a mobile communications device;
   receiving a buffer status report from the mobile communications device having buffer status information for each type of data and an indication that the base station should switch between a talk spurt period and a silent period for a VoIP service; and
   releasing or re-allocating persistently allocated uplink resources to the mobile communications device in dependence upon the received indication.

* * * * *